United States Patent [19]

Miller et al.

[11] Patent Number: 4,774,003
[45] Date of Patent: Sep. 27, 1988

[54] ION EXCHANGE EXTRACTION OF METALLIC AND NON-METALLIC ANIONS BY CONTROL OF THE BASICITY OF AMINE EXTRACTANTS

[75] Inventors: Jan D. Miller; Michael B. Mooiman, both of Salt Lake City, Utah

[73] Assignee: University of Utah, Salt Lake City, Utah

[21] Appl. No.: 22,552

[22] Filed: Mar. 6, 1987

Related U.S. Application Data

[63] Continuation of Ser. No. 526,423, Aug. 25, 1983, abandoned.

[51] Int. Cl.$^4$ .................. B01D 11/04; B01D 15/04
[52] U.S. Cl. .................................. 210/638; 210/639;
210/684; 423/24; 423/49; 423/63; 423/54;
75/101 BE
[58] Field of Search ............... 210/638, 639, 634, 684,
210/685, 688, 668; 75/101 BE, 101 R, 107;
423/54, DIG. 14, 568, 49, 22, 24, 23, 63;
252/364

[56] References Cited

U.S. PATENT DOCUMENTS

| | | | |
|---|---|---|---|
| 3,751,555 | 8/1973 | Peterson | 423/49 |
| 3,848,069 | 11/1974 | Carey et al. | 423/49 |
| 3,856,917 | 12/1974 | Texier et al. | 210/634 |
| 3,857,919 | 12/1974 | Hazen et al. | 423/54 |
| 3,988,224 | 10/1976 | Barriere et al. | 423/24 |
| 4,097,272 | 6/1978 | Rappas et al. | 75/101 BE |
| 4,108,963 | 8/1978 | Cuer et al. | 423/321 S |
| 4,111,702 | 9/1978 | Fraik | 106/21 |
| 4,115,512 | 9/1978 | Kerfoot | 423/24 |
| 4,166,098 | 8/1979 | Watanabe et al. | 423/139 |
| 4,248,837 | 2/1981 | Lai et al. | 75/101 BE |
| 4,272,492 | 6/1981 | Jensen | 156/642 |
| 4,344,924 | 8/1982 | Lucas et al. | 423/54 |
| 4,372,830 | 2/1983 | Law | 75/107 |
| 4,374,099 | 2/1983 | Kim et al. | 75/101 BE |
| 4,442,073 | 4/1984 | Robinson et al. | 423/54 |
| 4,446,026 | 5/1984 | Beutier et al. | 210/639 |
| 4,540,435 | 9/1985 | Miller et al. | 423/24 |
| 4,543,169 | 9/1985 | D'Agostino et al. | 423/24 |

OTHER PUBLICATIONS

G. Duyckaert et al, Recent Developments and New Combinations of Extractants in Synergic Processes, Canadian Institute of Metallurgy, special vol. 21, 1979, pp. 73-86.

W. D. Wilkinson, Uranium Metallurgy, 1962, Interscience Publishers, pp. 143 and 163.

Primary Examiner—Benoit Castel
Attorney, Agent, or Firm—Trask, Britt & Rossa

[57] ABSTRACT

Amine extractants useful in extracting metallic anions are modified with Lewis bases, having substantial organic solubility, such as tributyl phosphate, to improve the extraction capability of such amines. Generally, addition of Lewis bases to weakly basic amines increases the basicity of such amines.

8 Claims, 2 Drawing Sheets

ION EXCHANGE EXTRACTION OF METALLIC AND NON-METALLIC ANIONS BY CONTROL OF THE BASICITY OF AMINE EXTRACTANTS

This application is a continuation, of application Ser. No. 526,423, filed Aug. 25, 1983, now abandoned.

BACKGROUND OF THE INVENTION

1. Field

The invention is in the field of ion exchange of various metallic and non-metallic anions. The term "ion exchange" is considered broadly to include extraction of ions from solutions by the use of both liquid and solid extractants.

2. Prior Art

Ion exchange is well known and widely used in hydrometallurgy and water purification. Liquid ion exchange, generally known as solvent extraction, carried out by various organic liquid extractants, with or without diluents or modifiers, has been used in hydrometallurgy for the recovery of uranium, copper, and other metals. Natural zeolites have long been used as a solid ion exchange material for water softening, but have been largely replaced by synthetic resins which are also widely used for waste water purification and in hydrometallurgy for the separation of metallic ions. The use of ion exchange resins is a form of ion exchange that provides a solid substrate. Such a substrate may have chemically combined or attached moieties or groups active in the ion exchange process or the substrate may function merely as a carrier for an active extractant such as inert resins impregnated with liquid extractants. The use of activated carbon, as in the recovery of gold from solution, can be and is here regarded also as a form of ion exchange involving a solid substrate and is included within the scope of the invention when treated with a modified amine extractant.

Ion exchange in its various forms has received considerable attention in recent years, and is being widely used in particular instances, especially in hydrometallurgy. However, due to limitations inherent in the nature of many extractants, there has been a long felt need to widen the scope and improve the technology of various ion exchange systems. Such a situation exists in the case of amines capable of protonation, i.e. weak base amines. Their extractive properties at low pH values have been known, but their inability to act as extractants at high pH values has limited their usefulness.

The amines capable of protonation which have been used on an industrial scale as metallic and non-metallic anion extractants are generally primary, secondary, and tertiary amines, especially alkyl amines. Instances of such use of secondary and tertiary alkyl amines are as follows:

TABLE A

| Metal | Aqueous Feed Solution | Amine Extractant |
| --- | --- | --- |
| Molybdenum | Acid Sulfate | Tertiary |
| Tungsten | Acid Sulfate | Secondary |
| Uranium | Acid Sulfate | Tertiary |
| Vanadium | Acid Chloride | Tertiary |

It is important to note that industrial use of these amine extractants has been limited to acidic solutions. This is because amines capable of protonation are such weak bases that they can only effectively act as extractants in acidic and neutral solutions.

In the laboratory, primary, secondary, and tertiary alkyl amines have been used for the recovery of anions from solution. A number of metals exist as anionic complexes. However, extraction of such metals using amines as ion exchange extractants is generally limited to pH values less than 7. This can be seen from the following compilation based upon $pH_{50}$ extraction with 0.05 M amine/xylene solutions:

TABLE B

| Amine Extractant | Amine Basicity, $pH_{50}$ | | | | |
| --- | --- | --- | --- | --- | --- |
| | Gold Cyano-anion | Iron Cyano-anion | Molybdenum Oxyanion | Chrominum Oxyanion | Vanadium Oxyanion |
| Primary (Primene JM-T) | 6.55 | 5.50 | 5.85 | 5.90 | 6.96 |
| Secondary (Adogen 283) | 7.15 | 5.70 | 5.80 | 6.35 | 6.90 |
| Tertiary (Alamine 336) | 5.66 | — | 5.08 | 4.80 | 5.18 |

Primene JM-T, produced by Rohm and Haas, is a primary alkyl amine having 18 to 22 carbon atoms in the alkyl group. Adogen 283, produced by Sherex, is a secondary amine having the formula $R_2NH$ wherein R is an alkyl group of 13 carbon atoms. Alamine 336, produced by Henkel, is a tertiary amine having the formula $R_3N$ wherein R is an alkyl group having eight to ten carbon atoms.

As is well known, the $pH_{50}$ of a given extraction is that pH at which fifty percent of the desired anion has been extracted from the solution. It can be considered to be a measure of the amine's strength, i.e. ability to extract, or an indication of basicity. A higher value of $pH_{50}$ is indicative of an increase in base strength or basicity. The $pH_{50}$ is used by those skilled in the art as an indication of the pH region in which extraction can be accomplished.

The recovery of gold from gold-cyanide leach solutions is of particular interest, as such recovery has heretofore not been possible using solvent extraction techniques. This is because a suitable extractant for solvent extraction from alkaline cyanide solutions has not heretofore been known. Gold has generally been recovered from cyanide leach solutions through processes using carbon in pulp, carbon in columns, or through the Merrill-Crowe process. Solvent extraction, if perfected, has certain advantages over such techniques.

As is shown above, the use of primary, secondary, and tertiary alkyl amines as extractants has previously required acidic conditions. Since lowering the pH of a gold-cyanide leach solution to below 9.3 may cause the evolution of toxic cyanide gas, such an extraction process using these amines has not previously been practical.

Tributylphosphate (TBP) and other organic phosphorous oxides have been used in industrial plants as either extractants or modifiers. They have been used to extract metallic anions from acidic solutions, or to modify acidic extractants in the recovery of metallic cations. However, so far as we are aware, neither IBP nor any other organic phosphorous oxide has ever been effectively employed as a modifier of an amine, or of an amine group compound, such as analine, amidine, or guanidine, for industrial solvent extraction purposes. This is consistent with published experimental results which show that adding TBP or other organic phosphorous oxides to tertiary amines causes only a slight enhancement of the extraction of certain metallic anions. ("Recent Developments and New Combinations of Extractants in Synergic Processes" by G. Duyckaert and J. F. Desreux, Canadian Institute of Metallurgy, Special Volume 21, 1979, pages 73, 82.) Such a slight enhancement has not encouraged the investigation of the possible use of organic phosphorous oxides as amine modifiers in an ion exchange system.

DESCRIPTION OF THE DRAWINGS

In the drawings, which represent the best mode presently contemplated for carrying out the invention.

SUMMARY OF THE INVENTION

In accordance with the invention, a primary, secondary, or tertiary alkyl amine or similar amine-group compound, capable of protonation, is modified by the addition thereto of a modifier, particularly one soluble in an organic phase having an unshared electron pair and capable of solvation (hydration) and/or coordination with the amine extractant and/or the anion extracted. An effect of such modifier generally results in an increase in the basicity of the amine system so modified.

Suitable modifiers may be Lewis bases, especially organic chalcogenides such as organic phosphorous oxides, organic phosphorous sulfides, and organic sulfur oxides such as sulfoxides and sulfones, and the like which, in general, have an unshared electron pair. This amine extractant, whether as a solution for solvent extraction or as an ion exchanqe substrate, is brought into contact with or is contacted by the solution from which the desired metallic or non-metallic anions are to be separated. Such modification of an amine or amine-group compound to extract metallic anions from various basic aqueous solutions containing same, particularly cyanide leach solutions, increases selectivity in various instances for extraction of a particular anion from both acidic and basic solutions.

Solutions containing anionic metallic complexes, such as metallic cyanoanionic, oxyanionic, chloroanionic, and thioanionic complexes, can be processed in accordance with the invention for the recovery of the metallic anions. In particular, gold as well as chromium, vanadium, molybdenum, tungsten, and rhenium ions have been separated from solution by the herein disclosed solvent extraction process.

In the case of gold cyanide leach solutions, it is possible to extract the gold directly without acidifying the solution. Moreover, retention times would be much lower than in conventional carbon adsorption processes.

In accordance with the invention, stripping can be accomplished in all instances by an aqueous solution more alkaline than the extractant solution.

DESCRIPTION OF THE ILLUSTRATED EMBODIMENTS

The process may be carried out in any of the equipment common in ion exchange systems, i.e., ion exchange by solvent extraction, by resin in columns or resin-in-pulp, or by the use of activated carbon or other solid support for the modified amine extractant, such as porous polymer beads, due consideration being given to the particular leach or other solution to be treated.

Figure 1:
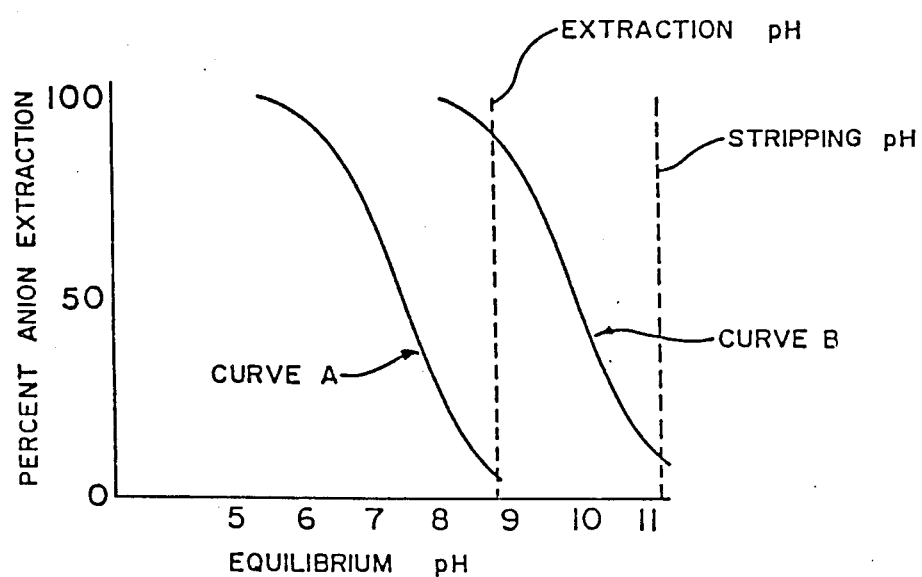
FIG. 1 is a generalized graph made up by plotting percent extraction of a desired anion in solution against equilibrium pH of the solution utilizing an amine extractant with and without modification pursuant to the invention, which also indicates the pH's at which extraction and stripping of the anion from the modified amine can occur.

An illustration of increased amine basicity is shown by the two curves presented in FIG. 1. These are not based on any actual test results, but provide a generalized showing of how the invention differs from known practices. These curves plotting percent extraction versus pH indicate the pH region in which extraction is possible by an extractant both with and without addition of a modifier. The curve positions are relative inasmuch as an exact position will depend upon the concentration of the anion, amine and modifier. Until this invention, extraction using amines capable of protonation could only be carried out at a low pH. This is illustrated by curve A (no modifier added). When a suitable modifier is added to such an amine according to the invention, the basicity of the amine is increased and it functions as an extractant of anions from basic solutions. Hence, when such an amine is modified according to the invention, the extraction curve is shifted to a higher pH range. This is illustrated by curve B (modifier added) indicating that extraction is possible from an alkaline solution. The amount by which the curve is shifted, i.e., the difference in the pH ranges between curves A and B, depends upon the particular anion and modified extractant.

The process is applicable generally, but has particular applicability to the industrial recovery of gold from alkaline cyanide leach solutions. While amine extractants have been used heretofore on a laboratory scale, as previously indicated it has been necessary to acidify the cyanide solution beforehand in order to accomplish extraction. With the process of the invention, extraction of gold from alkaline solutions is made possible without acidification.

Figure 2:
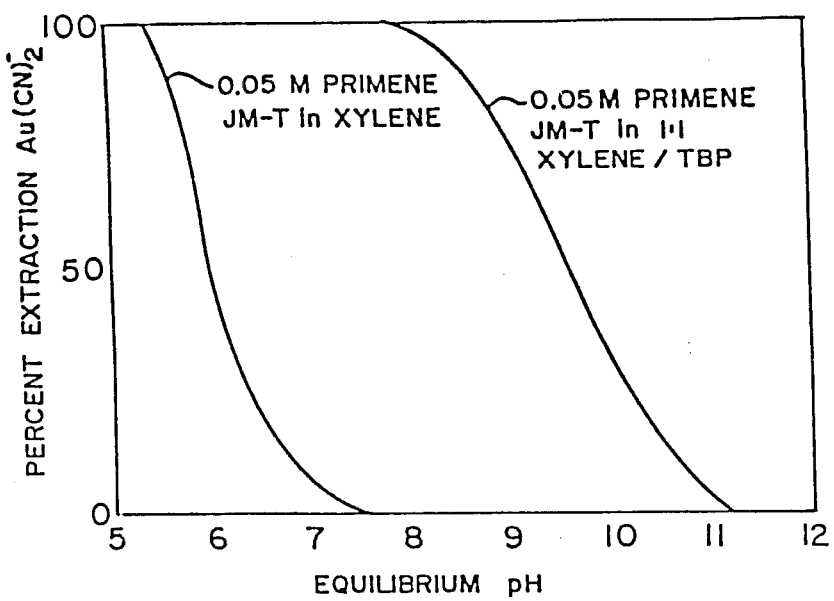
FIG. 2, a similar graph for comparative purposes comprising two separate curves made up from test data by plotting percent extraction against equilibrium pH in the extraction of gold from a gold-cyanide solution utilizing, in the one instance, solely an amine extractant in a diluent and, in the other instance, the same amine extractant modified in accordance with the invention.

Increase of the basicity of an amine extractant in accordance with the invention is illustrated in FIG. 2, which shows experimentally that gold extraction from an alkaline gold-cyanide solution is possible with modifier addition. It is noteworthy that $pH_{50}$ shifted from 6.05 to 9.85 indicative of a significant increase in amine basicity. Operation in the alkaline pH region is an important advantage of the invention, since acidification of a gold-cyanide solution causes evolution of highly dangerous cyanide gas. Therefore, this invention makes practical for industrial use the recovery of gold from alkaline gold-cyanide leach solutions.

The control of amine basicity through the invention allows the selective recovery of a particular anion from a solution containing several different anions. This is due to the fact that the amount of shift in the extraction curve for particular anions may vary significantly, depending upon the nature of the anion, the amine and the modifier.

Although the modifiers described herein generally increase the basicity of primary, secondary and tertiary amine extractants, an especially important aspect of the invention resides in the shifting of the $pH_{50}$ curve for particular anions. In many instances, the pH of the aqueous medium may be adjusted by a base such as ammonium hydroxide, sodium hydroxide or the like to permit extraction at a pH greater than 7 to take advantage of the increased extraction capabilities in the basic region. Thus, in some instances, there is very little apparent increase in basicity of the amine extractant inasmuch as substantially no shift occurs in the pH curve for extraction of particular anions. This provides the basis for selective extraction. For example, it has been found that the shift to the right on the extraction curve is small for the molybdate anion when tne :nvention is applied, in comparison with the shift for the vanadate anion. Thus, vanadate anions in solution can be separated from molybdate anions in the same solution in accordance with the invention.

Again, iron is normally present in cyanide leach solutions. As indicated by the comparative graph of FIG. 3, the modified amine extractant is highly selective in its extraction of the gold as against the iron. In the particular test instances on which the graph is based, the extractant was an 0.05 M Adogen 283 ($R_2NH$, where R is a hydrocarbon of eight to ten carbon atoms) in a one to-one mixture of the diluent xylene and the modifier TBP.

Also, good selectivity with respect to copper, mercury, and zinc (possible contaminants in cyanide leach solutions) has been achieved is accordance with the invention.

Figure 3:
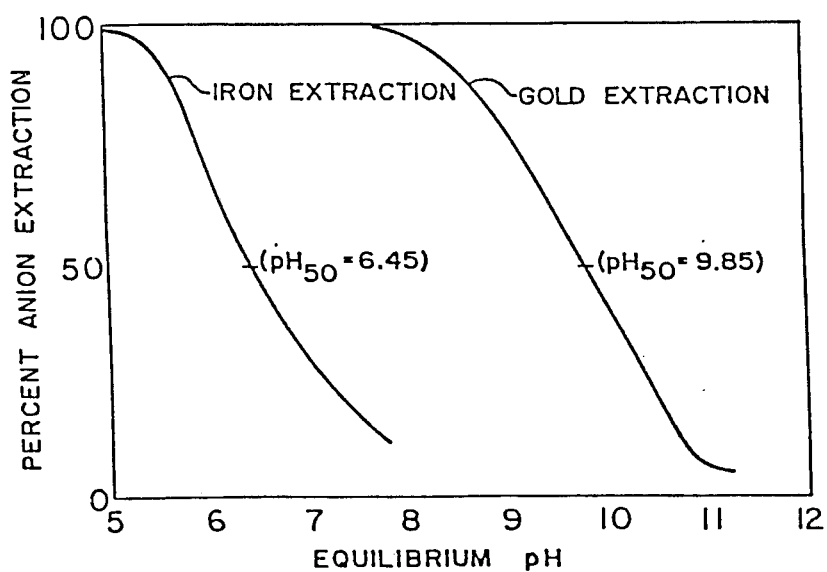
FIG. 3, a similar graph showing extraction of gold in comparison with extraction of iron by the present process from cyanide solutions.

The improved selectivity is reflected in FIG. 3 by a difference in $pH_{50}$ of 3.4, whereas in the absence of modifier (see Table B) the difference is $pH_{50}$ between gold and iron is only 1.4.

A variety of solvent extraction tests have been conducted to determine both the increase in amine basicity made possible by the addition of various modifiers and the minimum effective amount of modifier which must be added to the extraction system to cause a satisfactory level of anion extraction at a desired pH. Some results of these tests were presented hereinabove.

Basicity of an amine and increase in basicity in accordance with the invention were determined by tests in which the pH of the aqueous solution containing the anions to be recovered was varied. The range of variation was determined from the nature of the particular anion to be recovered, the particular amine employed, andthe particular modifier employed. Several pH values within this range were chosen. Each test was made as follows:

50 mls. of the aqueous and organic phases on a one-to-one basis were added to a beaker. The organic phase was prepared by dissolving a specific amount of the amine extractant in a diluent, with which was mixed a percent by volume of the modifier believed to be an effective amount. The pH was adjusted to the first of the pH values within the predetermined range while stirring the mixed solutions. The stirring was continued for a period of ten minutes, during which the pH was continuously monitored and adjusted to the required value. After ten minutes, the stirring was stopped and the phases allowed to disengage. A 2 ml. sample of the aqueous phase was then removed, filtered, and analyzed for the metal content by atomic absorption spectroscopy. A 2 ml. sample of the organic phase was also removed in order to maintain a constant phase ratio. Stirring was then recommenced, the pH adjusted to the second value within the range, and the test procedure repeated. Such testing was carried out for all values within the range.

Accordingly, a series of percentage extraction values over the predetermined pH range was obtained and used to construct the percent extraction versus pH curves, examples of which are shown in FIGS. 2 and 3. From such curves, the $pH_{50}$ values were calculated.

The $pH_{50}$'s for typical gold cyanide tests of this nature using different extractant-modifier combinations are as follows:

TABLE 1

Amine Basicity ($pH_{50}$) For Different Extractant (0.05 M.)-Modifier Combinations Ten Percent Modifier in Xylene

| Modifier | 0.5 g. Primene JM-T | 0.9425 g. Adogen 283 | 0.8475 g. Alamine 336 |
| --- | --- | --- | --- |
| No Modifier | 6.05 | 7.15 | 5.66 |
| Tributyl phosphate (TBP) | 8.05 | 7.75 | 6.20 |
| Dibutyl-butyl phosphonate (DBBP) | 8.36 | 8.30 | 8.36 |
| Butyl dibutyl phosphinate (BDBP) | 8.95 | 8.72 | — |
| Tributyl phosphine oxide (TBPO) | 10.20 | 10.10 | — |
| Trioctyl phosphine oxide (TOPO) | 9.55 | 9.45 | 7.25 |

Once one has determined the increase in amine basicity for an extractant-modifier combination with respect to a particular anion, it is usually cost-effective to determine the minimum amount of modifier required to effect the desired increase in basicity. This minimum effective amount of modifier may be determined by varying the percentage of modifier present in the organic phase of the extraction solution and, through the procedure discussed above, by determining the change in amine basicity caused by the various amounts of modifier tested.

Results from typical experiments determining minimum effective amounts of modifier for particular extractant modifier combinations are as follows:

TABLE 2

Amount of TBP or DBBP Required For Gold Extraction From Cyanide Solutions Using 0.05 M. Adogen 283 in Modifier-Xylene Solutions

| Percentage of Modifier | $pH_{50}$ for TBP | $pH_{50}$ for DBBP |
| --- | --- | --- |
| 0 | 7.15 | 7.15 |
| 10 | 7.75 | 8.32 |
| 25 | 8.80 | 9.50 |
| 50 | 10.05 | 10.44 |

TABLE 2-continued

Amount of TBP or DBBP Required
For Gold Extraction From Cyanide Solutions Using
0.05 M. Adogen 283 in Modifier-Xylene Solutions

| Percentage of Modifier | pH$_{50}$ for TBP | pH$_{50}$ for DBBP |
|---|---|---|
| 75 | 10.20 | — |

The above tests are presented as a guide to those skilled in the art for applying the invention to particular situations. In any particular instance, the minimum effective amount of modifier must be determined experimentally for each extractant-modifier combination. As has been indicated, it is customary to express the results of these tests in terms of the pH$_{50}$. The minimum effective amount of modifier may be determined from the laboratory tests of Tables 1 and 2.

Typical examples of the invention carried out in the laboratory for the recovery of particular metallic anions are as follows:

EXAMPLE NO. 1

An extractant solution was made up of 0.50 g. of Primene JM-T, a primary amine, in 50 ml. of the diluent, xylene. A second extractant solution was made up of 0.50 g. of Primene JM-T in 25 ml. of the diluent, xylene, and 25 ml. of the organic phosphorous oxide modifier, TBP. These two extractant solutions were individually contacted with a gold solution containing 0.0823 g. of potassium gold cyanide, KAu(CN)$_2$, in 50 ml. distilled water. The contacting, pH adjustment, and sample procedures were as previously described for the tests of Tables 1 and 2. The results for various equilibrium pH's are as follows:

TABLE 3

| Equilibrium pH | Percent Gold Extraction by Unmodified Amine | Percent Gold Extraction by Mofidied Amine |
|---|---|---|
| 5 | 100.0 | 100.0 |
| 6 | 71.5 | 100.0 |
| 7 | 6.6 | 100.0 |
| 8 | 0 | 100.0 |
| 9 | 0 | 94.7 |
| 10 | 0 | 41.2 |
| 11 | 0 | 2.0 |

The results showed that greater than 90% extraction is obtained with the unmodified amine at about pH 5, whereas for the modified amine the same result can be obtained at about pH 9. This is indicative of an increase in amine basicity with respect to gold extraction and indicates that with a modified amine it is now possible to extract gold from basic cyanide solutions.

EXAMPLE NO. 2

An extractant solution was made up of 2.4 g. of Adogen 283, a secondary amine in 25 ml. of the diluent xylene and 25 ml. of the organic phosorous oxide modifier TBP. This extractant solution was contacted with an aqueous solution containing 0.0823 g. potassium gold cyanide, KAu(CN)$_2$, in 50 ml. distilled water (1000 ppm gold). The contacting, pH adjustment, and sample procedures were as previously described for the tests that resulted in Tables 1 and 2. This experiment was repeated using a gold solution 100 times more dilute, i.e., 0.00082 g. KAu(CN)$_2$ in 50 ml. of distilled water (10 ppm gold). The results for different pH's are presented as follows:

TABLE 4

| Equilibrium pH | Percent Extraction from 10 ppm Gold Solution | Percent Extraction from 1000 ppm Gold Solution |
|---|---|---|
| 9.5 | 100.0 | 99.0 |
| 10.0 | 87.3 | 85.5 |
| 10.5 | 73.2 | 55.0 |
| 11.0 | 27.1 | 36.5 |
| 11.5 | 11.8 | 9.8 |

These experimental results indicate that, even when the gold concentration is decreased one hundred fold, the extent of gold extraction is not diminished. Also, it indicates that gold could be extracted by this amine/modifier combination from heap leach solution which may contain from 1 to 15 ppm gold as Au(CN)$_2$ at a high pH.

Stripping of the loaded extractant is accomplished by contacting the organic phase with a highly basic aqueous solution, as shown in FIG. 1. This stripping procedure has been tested by mixing the loaded organic solution from Example 1, which contained the gold-cyanide anion, with 0.1 M sodium hydroxide on a one-to-one basis at pH 13 for fifteen minutes. The organic and aqueous phases were allowed to disengage and the aqueous phase analyzed using atomic absorption spectroscopy. From this test, it was found that the organic phase was stripped of greater than ninety percent of its contained gold value. Any base which raises the pH of the stripping mixture will effect a satisfactory recovery, e.g., lime, ammonia, or potassium hydroxide. These stripping procedures which have been used in other solvent systems for other types of solvent extraction may also be effective when applied to a loaded extractant of the invention, e.g., direct precipitation of metallic values by reduction, conversion of the metallic anion to a neutral or a cationic form, or changing the temperature of the organic phase.

While no tests have been run as yet with respect to non-metallic solutions, such as waste water, there is no reason to believe that effective results will not be obtained when applying the invention as indicated above.

In solvent extraction, the amines are preferably primary, secondary, or tertiary amines attached to an organic moiety, such as an aromatic or aliphatic group. The organic moiety preferably contains sufficient carbon atoms to provide an amine compound with substantial solubility in organic systems. Typical amine compounds are those having a minimum of about six carbon atoms. Cyclic amines such as pyridine, pyrimidine, and the like may also be used as well as substituted amines such as guanidine and the like.

Suitable modifiers useful in the instant invention are those having the ability to increase the strength or basicity of an amine extractant capable of extracting anions. Such modifiers to be useful in organic extraction process have substantial solubility in such organic systems. Lewis bases having substantial organic solubility may be utilized advantageously. In particular, oxides and sulfides of phosphorous and oxides of sulfur, for example, dibutyl sulfoxide, may be effective as modifiers. Phosphorous oxides are preferred, and the following compounds are examples of suitable phosphorous oxides:

Tributyl phosphate
Dibutyl-butyl phosphonate
Butyl dibutyl phosphinate
Tributyl phosphine oxide Trioctyl phosphine oxide
Other alkyl moieties, for example, propyl pentyl, hexyl, heptyl and the like may be substituted for the butyl and octyl groups of the listed compounds.

Many phosphorous oxides useful in the invention have the following structure:

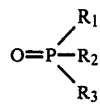

wherein $R_1$, $R_2$, and $R_3$ may be the same or different alkyl or alkoxy groups. Substitutions of sulfur for the O= radical may be made to create useful sulfide modifiers. The alkyl and alkoxy groups are such as to contribute significant solubility in organic solvents and especially contain lower alkyl or alkoxy groups having less than about ten carbon atoms.

The exact mechanism by which the modifiers of this invention improve the extraction capability of amines is not fully understood. The modifiers are generally known as having significant capability for water absorption. In the amine system, the modifiers may be exerting a solvating action with respect to the amines or the amine anion complex, resulting in substantial solvation. The solvated amines may be more active in extraction of metal anions than non-solvated amines. Other techniques for solvating amine extractants capable of protonation or their corresponding amine anion complexes may be expected to enhance the extraction capability of such amines.

Whereas this invention is here illustrated and described with specific reference to an embodiment thereof presently contemplated as the best mode of carrying out such invention in actual practices, it is to be understood that various changes may be made in adapting the invention to different embodiments without departing from the broader inventive concepts disclosed herein and comprehended by the claims that follow.

We claim:

1. In an amine extraction process employing water insoluble amines capable of protonation to extract gold and rhenium anions from an alkaline aqueous solution, the improvement comprising conducting said extraction under substantially alkaline conditions by adding a modifier to increase the basicity of the amine extractant, said modifier being an organic soluble compound capable of sharing a pair of electrons, and said amine extractant being a primary, secondary or tertiary amine attached to an organic moiety having a minimum of six carbon atoms.

2. The process of claim 1 wherein the improvement further comprises the modifier being a Lewis base.

3. The process of claim 1 wherein the improvement further comprises the modifier being an organic chalcogenide selected from the group consisting of organic phosphorous oxides, organic phosphorous sulfides, and organic sulfur oxides.

4. The process of claim 3 wherein the improvement further comprises the modifier being an organic phosphorous oxide selected from the group consisting of phosphates, phosphonates, phosphinates, and phosphine oxides.

5. The process of claim 1 wherein the improvement further comprises the modifier having minimal water solubility.

6. The process of claim 1 wherein the improvement further comprises the anions being a metal complex.

7. The process of claim 1 wherein the improvement further comprises the extraction process being a liquid extraction process.

8. The process of claim 1 wherein the improvement further comprises the amine being associated with a solid substrate.

* * * * *